(12) United States Patent
Wu et al.

(10) Patent No.: US 9,584,798 B2
(45) Date of Patent: Feb. 28, 2017

(54) METHOD AND APPARATUS FOR MANAGING 3D VIDEO CONTENT

(75) Inventors: Jing Wu, Norcross, GA (US); Ajay K. Luthra, San Diego, CA (US); Paul A. Clancy, Duluth, GA (US); James R. Flesch, Tucker, GA (US)

(73) Assignee: Google Technology Holdings LLC, Mountain View, CA (US)

( * ) Notice: Subject to any disclaimer, the term of this patent is extended or adjusted under 35 U.S.C. 154(b) by 1066 days.

(21) Appl. No.: 12/964,452

(22) Filed: Dec. 9, 2010

(65) Prior Publication Data

US 2012/0147157 A1 Jun. 14, 2012

(51) Int. Cl.
*H04N 13/04* (2006.01)
*H04N 9/47* (2006.01)

(52) U.S. Cl.
CPC ..... *H04N 13/0438* (2013.01); *H04N 13/0497* (2013.01)

(58) Field of Classification Search
CPC ............ H04N 13/0438; H04N 13/0497
USPC .................................................. 348/56
See application file for complete search history.

(56) References Cited

U.S. PATENT DOCUMENTS

| 4,907,860 A | 3/1990 | Noble |
| 6,687,399 B1 | 2/2004 | Chuang et al. |
| 6,724,352 B1 | 4/2004 | Wu |
| 8,089,507 B2 | 1/2012 | Ikeda et al. |
| 8,294,752 B2 * | 10/2012 | Mihara et al. .................. 348/53 |
| 2001/0028413 A1 * | 10/2001 | Tropper ........................... 349/16 |
| 2008/0263621 A1 | 10/2008 | Austerlitz et al. |
| 2009/0051759 A1 * | 2/2009 | Adkins et al. ................... 348/53 |
| 2010/0091207 A1 | 4/2010 | Hasegawa et al. |
| 2010/0194857 A1 | 8/2010 | Mentz et al. |
| 2010/0259603 A1 | 10/2010 | Mihara et al. |
| 2011/0134231 A1 | 6/2011 | Hulvey et al. |

(Continued)

FOREIGN PATENT DOCUMENTS

| CN | 101222648 A | 7/2008 |
| CN | 101727807 A | 6/2010 |

(Continued)

OTHER PUBLICATIONS

"Wireless 3D Glasses: Maintain Sync Without an IR Transmitter", by HalfBakery.com. Dec. 11, 2002. As found at: http://www.halfbakery.com/idea/Wireless_203D_20Glasses.

(Continued)

*Primary Examiner* — Jeremaiah C Hallenbeck-Huber
(74) *Attorney, Agent, or Firm* — Byrne Poh LLP

(57) ABSTRACT

In a method of managing 3D video stream, 3D video stream is output to a connected display. The connected display displays the 3D video stream after a delay associated with the connected display. A timing offset is determined based on the delay. The timing offset is operable to be used to synchronize shutter operations of at least one shutter glasses with the presentation of the 3D video stream. A shutter control signal based on a frame start indication from the 3D video stream is transmitted. The frame start indication is operable to be used to determine a frame rate of the 3D video stream, and the shutter control signal is operable to be used to maintain synchronization of the shutter operations of the at least one shutter glasses with the presentation of the 3D video stream at the connected display.

20 Claims, 8 Drawing Sheets

(56) References Cited

U.S. PATENT DOCUMENTS

| | | | |
|---|---|---|---|
| 2011/0211049 A1* | 9/2011 | Bassali | H04N 13/0029 348/51 |
| 2011/0211051 A1* | 9/2011 | Park | H04N 13/0438 348/53 |
| 2011/0310221 A1 | 12/2011 | Meuninck et al. | |
| 2012/0019633 A1* | 1/2012 | Holley | 348/53 |
| 2012/0050506 A1* | 3/2012 | Shintani | H04N 13/0497 348/56 |
| 2012/0050856 A1* | 3/2012 | Shintani | 359/464 |
| 2013/0076877 A1 | 3/2013 | Hung et al. | |

FOREIGN PATENT DOCUMENTS

| | | |
|---|---|---|
| CN | 201623818U U | 11/2010 |
| EP | 2325686 A1 | 5/2011 |
| WO | 9743681 A1 | 11/1997 |
| WO | 2007024313 A1 | 3/2007 |
| WO | 2010091113 A1 | 8/2010 |
| WO | 2011098936 A2 | 8/2011 |

OTHER PUBLICATIONS

Product page for VirtualFx 3D TV Converter, as found on http://www.edimensional.com/product_info.php?products_id=39.

"Using this website to learn how 3D TV works", by Jonathan Strickland, HowStuffWorks.conn, a Discovery Channel. Visited Oct. 19, 2010. URL: http://www.howstuffworks.com/3d-tv.htm/printable.

"OpenCable Specifications: Content Encoding Profiles 3.0 Specification", Cable Television Laboratories, Inc. Dated Aug. 27, 2010.

Joong Min RA: A simulation model of 3D crosstalk phenomenon on 3D plasma display with active shutter glasses, Nov. 2011, vol. 57, Issue: 4, all pages.

Patent Cooperation Treaty, "PCT Search Report and Written Opinion of the International Searching Authority" for International Application No. PCT/US2012/055314 dated Jan. 25, 2013, 21 pages.

"3D-Crosstalk" Dec. 31, 2010; Retrieved from the Internet: URL:http://burosh.de/technische-informationen/332-3d-crosstalk-testbilder.html; retrieved on Jan. 18, 2013; 10 pages.

Notification of First Office Action, The State Intellectual Property of the People's Republic of China, Jan. 10, 2014, all pages.

Office Action dated Dec. 22, 2014 in Chinese Patent Application No. 201110409350.X.

Office Action dated Jul. 22, 2014 in Chinese Patent Application No. 201110409350.X.

\* cited by examiner

METHOD AND APPARATUS FOR MANAGING 3D VIDEO CONTENT

BACKGROUND

Depth perception for a three dimensional television (3D TV) is provided by capturing two views, one for the left eye and other for the right eye. These two views are compressed and sent over various networks or stored on storage media. A decoder decodes the two views and sends the decoded video to the 3D TV for display. The two views are known to be either merged into a single video frame (e.g., checker board pattern, left and right, or top and bottom panels) or kept separate. The views are known to be displayed using a time sequential format in which one eye view follows another eye view in an alternating format.

In order to view 3D content, an end consumer uses a shutter glasses such as phase-shutter glasses. The shutter glasses must allow each eye to observe the corresponding image at the corresponding time. For example, the left side of the shutter glasses is open when the left eye image is displayed and the right side is closed, which allows the left eye to view the image but not the right eye. Similarly, the right side of the shutter glasses is open when the right eye image is displayed and the left side is closed, which allows the right eye to view the image but not the left eye.

The 3D TVs are known to emit a shutter control signal that is synchronized with the right or left eye image being displayed. However, this shutter control signal is known to be individualized for each 3D TV according to the manufacturer and, in some instances, the model of the 3D TV. The shutter control signal is not functional for 3D TVs from other manufacturers without a standardized protocol. Also, the shutter control signal is not functional for a non-3D-ready TV. Furthermore, it is difficult to provide an accurate shutter control signal from a set top box (STB) or another device outside the non-3D TV because of a timing difference due to differences in internal buffering, transmission delay, image processing delay etc on the end video rendering device. For example, the displayed frame at the TV lags behind the frame output from the STB for some amount of time, which varies from one display device to another display device, and thus, the shutter control signal emitted from the STB or devices other than the TV itself would not synchronize with the left or right eye image displayed on the TV. This can cause crosstalk of images because of the offset in left/right eye timing that in turn degrades or destroys the 3D effect.

SUMMARY

According to an example, a method of managing a three-dimensional (3D) video stream is disclosed. In the method, the 3D video stream is output to a connected display. The connected display displays the 3D video stream after a delay associated with the connected display. A timing offset is determined based on the delay. The timing offset is operable to be used to synchronize shutter operations of at least one shutter glasses with the presentation of the 3D video stream. A shutter control signal based on a frame start indication from the 3D video stream is transmitted. The frame start indication is operable to be used to determine a frame rate of the 3D video stream, and the shutter control signal is operable to be used to maintain synchronization of the shutter operations of the at least one shutter glasses with the presentation of the 3D video stream at the connected display.

According to another example, an apparatus is operable to manage a 3D video stream. The apparatus includes one or more modules configured to output the 3D video stream in a time sequential format to a connected display. The connected display presents the 3D video stream after a delay associated with the connected display. The one or more modules determine a timing offset based on the delay. The timing offset is operable to be used to synchronize shutter operations of at least one shutter glasses with the presentation of the 3D video stream. The one or more modules transmit a shutter control signal based on a frame start indication for the 3D video stream. The frame start indication is operable to be used to determine a frame rate of the 3D video stream, and the shutter control signal is operable to be used to maintain synchronization of the shutter operations of the at least one shutter glasses with the presentation of the 3D video stream at the connected display. The apparatus also includes a processor configured to implement the one or more modules.

In a further example, a non-transitory computer readable storage medium stores one or more computer programs implementing the above-disclosed methods of managing 3D video stream.

Examples of the disclosure provide a method and apparatus for managing 3D video stream. All display devices are known to have a delay between receipt of video stream and display of video content from the video stream on screen. The examples anticipate and calibrate out this delay for various display devices. The examples provide a process for an associated shutter glasses to accommodate a timing offset based on the wide-ranging delays associated with different display devices. The examples also provide a tracking mechanism, herein described as an emitter signal, concurrent to the 3D videostream provided to the display device that may be used to maintain synchronization at the associated shutter glasses over the course of viewing the 3D video stream. Various existing non-3D-ready displays may thereby be used to present 3D video stream in a manner that is properly synchronized with the associated shutter glasses.

Examples of the disclosure anticipate variable intra-TV video processing delays and provides a universal mechanism to accommodate variable video processing latency in end rendering equipment whilst maintaining appropriate synchronization of eye shuttering, and hence, maintaining the desired 3D video effect. Additionally, examples of the disclosure provide dynamic detection of start of left or right frame and synchronization of the shutter glasses to the 3D video streaming. The dynamic detection may be initiated at any time of the 3D video session by any viewer new to the session, after the session starts. The detection and synchronization is not solely restricted to the beginning of the 3D video playing session since it exploits graphic overlay (mixing) in the STB to facilitate display of the chroma markers at any user-commanded point in the video session. Because "pause" is a logical aspect of the video session and does not impact video framing, the calibration of the new user may in fact be implemented during a "pause" interruption of the video session play.

BRIEF DESCRIPTION OF THE DRAWINGS

Features of the invention will become apparent to those skilled in the art from the following description with reference to the figures, in which.

DETAILED DESCRIPTION

For simplicity and illustrative purposes, the invention is described by referring mainly to exemplary examples thereof. In the following description, numerous specific details are set forth to provide a thorough understanding of the invention. However, it will be apparent to one of ordinary skill in the art that the invention may be practiced without limitation to these specific details. In other instances, well known methods and structures have not been described in detail to avoid unnecessarily obscuring the invention.

Figure 1:
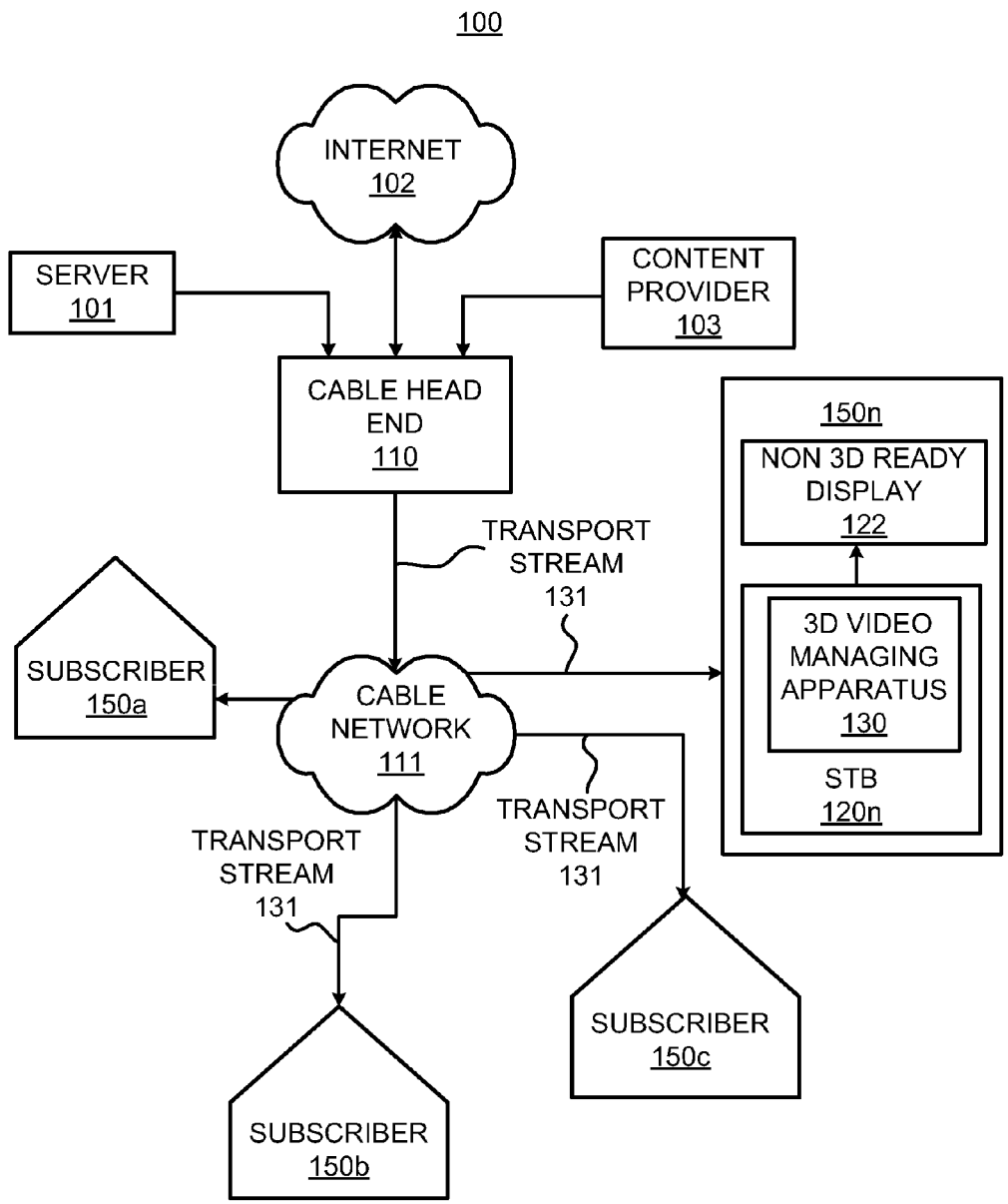
FIG. 1 illustrates a network architecture, according to an example of the invention.

FIG. 1 illustrates a network architecture 100 of a system in which a 3D video managing apparatus 130 may be used, according to an example. As shown in FIG. 1, the network architecture 100 is illustrated as a cable television (CATV) network architecture, including a cable head-end 110 and a cable network 111. A number of data sources 101, 102, 103, may be communicatively coupled to the cable head-end 110 including, but in no way limited to, a plurality of servers 101, the Internet 102, radio signals, or television signals received via a content provider 103. The cable head-end 110 is also communicatively coupled to one or more subscribers 150a-150n through the cable network 111. It should be understood that the network architecture 100 depicted in FIG. 1 may include additional components and that some of the components described herein may be removed and/or modified without departing from a scope of the network architecture 100.

The cable head-end 110 is configured to output a transport stream 131 to the subscribers' 150a-150n set top boxes (STBs) 120a-120n through the cable network 111, which may include a satellite transmission, the Internet 102 or other network using, for instance, fixed optical fibers or coaxial cables. The transport stream 131 may comprise Internet Protocol (IP) packets or may conform to any packetization scheme configured to enable transmission of the transport stream 131. For instance, the transport stream 131 may comprise an MPEG stream, IP packets or any suitable medium for transporting the 3D video from a source to an end user. The STBs 120a-120n are devices that receive the transport stream 131 from the cable head-end 110 and process the transport stream 131 to be in a format for display on a television, computer monitor, personal digital assistant (PDA), cellular telephone, etc. According to an example, one or more of the STBs 120a-120n comprise standalone devices supplied by a cable or satellite television provider. According to another example, one or more of the STBs 120a-120n comprise devices and/or software integrated into one or more of televisions, computers, cellular telephones, PDAs, etc.

Each of the subscribers 150a-150n is equipped with a 3D decoder 130, which may be included in the STBs 120a-120n. The 3D decoder 130 is configured to decode the transport stream to form one or more 3D video streams. The 3D video stream(s) may be configured in a time sequential format in which left eye views and right eye views are alternately displayed. A selected 3D video stream may thereafter be sent to a connected display, for instance a 3D-ready display (not shown) or a non-3D-ready display 122. The non-3D-ready display 122 may comprise, for instance, a conventional 2D formatted television. In instances in which the 3D video stream is sent to 3D-ready displays, each 3D-ready display may send a shutter control signal to an emitter or a shutter glasses that is synchronized with the 3D video stream. The shutter glasses may be configured, for instance manufactured, to match a particular 3D-ready display. The shutter glasses may comprise, for instance, phase-shutter glasses configured to open and close shutters in a manner synchronized with the 3D video stream. A shutter glasses is a device configured to open or close left and right views in alternate sequence, to produce a 3D effect. The shutter control signal permits end consumers to view the 3D video stream in correct synchronization and sequence. However, the non-3D-ready display 122 is not capable of sending a shutter control signal to an emitter or the shutter glasses. Hence the non-3D-ready display 122 may be incapable of displaying the 3D video stream and provide depth perception.

In order for the end consumer to properly view the 3D video stream at the non-3D-ready display 122 using the shutter glasses, a 3D video managing apparatus performs a detection and synchronization process. The detection and synchronization process allows the shutter glasses to open and close corresponding left and right views at the shutter glasses in synchronization with the displayed 3D video content to provide a proper 3D effect, as described hereinbelow with respect to FIGS. 3A, 3B, 3C, 4A and 4B, the 3D video viewing systems 300, 330, and 350, and the methods 400 and 450.

Figure 2:
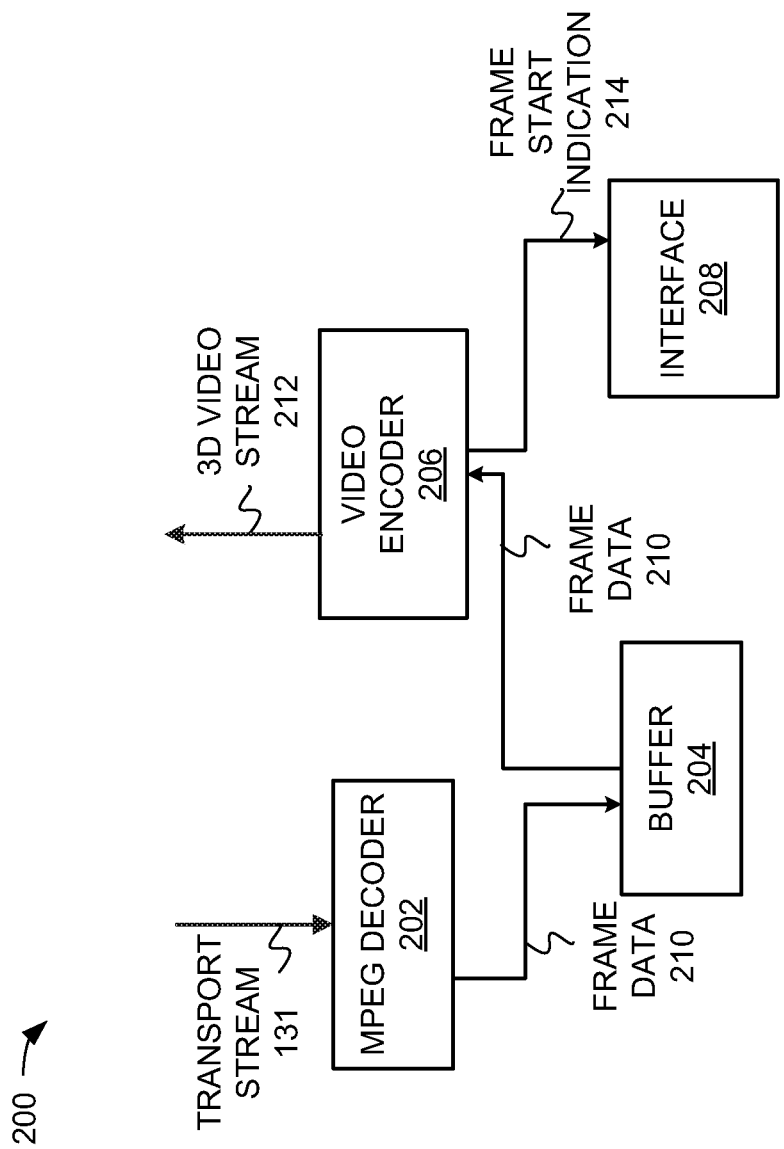
FIG. 2 illustrates a functional block diagram of a set top box, according to an example of the invention.

With reference now to FIG. 2, there is shown a functional block diagram of an STB 200 for managing 3D video, according to an example. The STB 200 is a particular example of the STB 120n and may be used in network architecture, such as but not limited to the network architecture 100 disclosed in FIG. 1, hereinabove. It should be understood that the STB 200 may include additional components and that one or more of the components described herein may be removed and/or modified without departing from a scope of the STB 200.

As shown in FIG. 2, the STB 200 includes an MPEG decoder 202, a buffer 204, a video encoder 206 and an interface 208 and comprises a conventional set top box. Alternately, the STB 200 may comprise any device other than an STB that can perform the function of the STB 200, for instance a gaming console.

The STB 200 may access the transport stream 131, for instance, by receiving the transport stream 131 from broadcast programs, Internet Protocol TV (IPTV), switched video (SDV), video on demand (VOD) or other video sources, as shown in FIG. 1. The MPEG decoder 202 receives the transport stream 131 and decodes the transport stream 131, generating frame data 210, for a selected program. The frame data 210 is stored during processing in the buffer 204. The video encoder 206 encodes the frame data 210 to form a 3D video stream 212, which may be output as HDMI component video. The 3D video stream 212 includes a first view and a second view (not shown) that enable the 3D video stream 212 to be displayed in 3D video format. The 3D video stream 212 accessed by the STB 200 is configured in a time sequential format.

The STB 200 also generates a frame start indication 214 at a start of each frame in the frame data 210. The frame start indication 214 may comprise a fixed timing signal that is operable to be used to determine a frame rate of the 3D video stream 212. The STB 200 may output the frame start indication 214 using an interface 208 to a 3D managing apparatus, such as but not limited to the 3D managing apparatuses 202a, 202b, and 202c disclosed in FIGS. 3A, 3B and 3C hereinbelow.

Figure 3A:
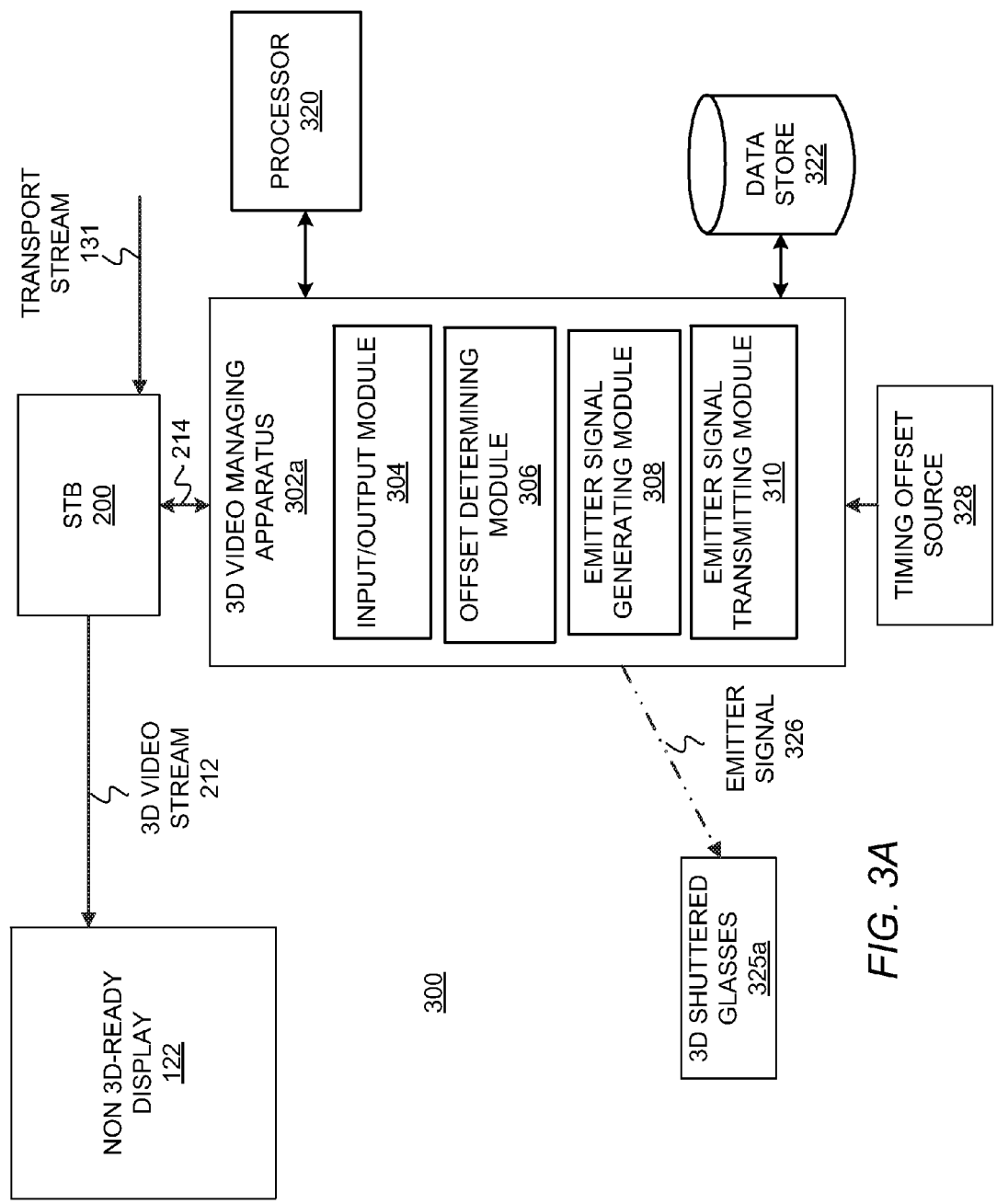
FIG. 3A illustrates a simplified block diagram of a 3D video viewing system, according to an example of the invention.

With reference now to FIG. 3A, there is shown a block diagram of a 3D video viewing system 300 for managing a 3D video stream 212, according to an example. It should be understood that the 3D video viewing system 300 may include additional components and that one or more of the components described herein may be removed and/or modified without departing from a scope of the 3D video viewing system 300.

The 3D video viewing system 300 includes a 3D video managing apparatus 302a, a processor 320, a data store 322, a timing offset source 328, an STB 200, a non 3D-ready display 122, for instance a conventional non-3D-ready display or monitor, and a 3D shutter glasses 325a. Generally speaking, the 3D video managing apparatus 302a is configured to provide adjunct signaling such that the 3D shutter glasses 325a may be synchronized with the non-3D-ready display 122 to permit end consumers to view field sequenced 3D programs, for instance as described hereinbelow with respect to FIGS. 4A and 4B and the methods 400 and 450. Specifically, the 3D video managing apparatus 302a performs as a calibration and synchronization manager to direct synchronization of the non-3D-ready display 122 and a shutter control signal for the 3D shutter glasses 325a, so that the left eye frame/right eye frames displayed on the non-3D-ready display 122 are perceptibly synchronized with shutter operations at the 3D shutter glasses 325a and results in a proper 3D effect as experienced by the end consumer.

The 3D video managing apparatus 302a is configured to be implemented and/or executed by the processor 320, which may comprise a microprocessor, a micro-controller, an application specific integrated circuit (ASIC), and the like. According to an example, the 3D video managing apparatus 302a may comprise an integrated and/or add-on hardware device of the STB 200. In one example, the 3D video managing apparatus 302a may comprise an external dongle. As another example, the 3D video managing apparatus 302a may comprise a computer readable storage device (not shown) upon which is stored one or more computer programs, which the processor 320 is configured to execute.

The 3D video managing apparatus 302a includes an input/output module 304, an offset determining module 306, an emitter signal generating module 308, and an emitter signal transmitting module 310. The modules 302-308 may comprise software modules, hardware modules, or a combination of software and hardware modules. Thus, in one example, one or more of the modules 302-308 comprise circuit components. In another example, one or more of the modules 302-308 comprise software code stored on a computer readable storage medium, which the processor 320 is configured to execute. As such, in one example, the 3D video managing apparatus 302a comprises a hardware device, such as, a computer, a server, a circuit, etc. In another example, the 3D video managing apparatus 302a comprises a computer readable storage medium upon which software for performing the functions of the modules 302-308 is stored. The various functions that the 3D video managing apparatus 302a performs are discussed in greater detail hereinbelow.

The input/output module 304 is configured to receive a frame start indication 214, that is output from the STB 200 simultaneously with the output of the 3D video stream 212 from the STB 200 to the non-3D-ready display 122. With regard to examples in which the 3D video managing apparatus 302a is an integrated and/or add-on hardware device of the STB 200, the input/output module 304 may detect the frame start indication 214 at a same time that the STB 200 outputs the 3D video stream 212 to the non-3D-ready display 122. According to an example in which the 3D video managing apparatus 302a is a device external to the STB 200, the 3D video managing apparatus 302a may receive the frame start indication 214 as any communication signal.

The offset determining module 306 is configured to determine a timing offset based on a delay associated with the non-3D-ready display 122. The timing offset is operable to be used to synchronize shutter operations of the 3D shutter glasses 325a with the presentation of the 3D video stream 212 at the connected display. For instance, the non-3D-ready display 122 may propagate variable intra-TV video processing delays between an instant that the 3D video stream 212 is output from the STB 120n to the non-3D-ready display 122 and an instant that the 3D content is presented on a screen of the non-3D-ready display 122. More particularly, a different delay may be introduced for each particular non-3D-ready display 122 based on a manufacturer, and a model of the non-3D-ready display 122 and/or a resolution, for instance high definition and low definition, of the displayed 3D video content processed from the 3D video stream 120. The offset determining module 306 determines a timing offset that may be used in a universal mechanism to accommodate variable video processing latency in end rendering equipment such as the non-3D-ready display 122 while maintaining appropriate synchronization of shutter operations (and hence, maintaining the desired 3D video effect) at the 3D shutter glasses 325a.

According to an example, the offset determining module 306 determines the timing offset by receiving the timing offset from the timing offset source 328. The timing offset source 328 may comprise, for instance, a database containing information regarding delays for each specific display based on factors affecting the delay including manufacturer, and model of the non-3D-ready display 122 and/or a resolution. According to an example the timing offset source 328 comprises an Internet database from which information regarding the particular non-3D-ready display 122 may be retrieved for input into the offset determining module 306. In another example, the timing offset source 328 comprises a secondary device that determines the timing offset, for instance an appropriately configured shutter glasses as described hereinbelow with respect to FIG. 3C and the 3D video viewing system 350.

The emitter signal generating module 308 is configured to generate an emitter signal 326. The emitter signal 326 is a shutter control signal and may be used by associated shutter glasses, for instance the 3D shutter glasses 325a, to synchronize shutter operations of the 3D shutter glasses 325a with the display of video content at the non-3D-ready display 122. The emitter signal 326 may be determined based on the framing start indication 214 for the 3D video stream 212 and the timing offset. By providing a timing offset for the framing start indication 214, substantially cancelling the delay propagated by the non-3D-ready display, the emitter signal synchronizes shutter operations of shutter glasses to presentation of the video frames of the 3D video stream 212.

The emitter signal transmitting module 310 is configured to transmit the emitter signal 326 to be received by the 3D shutter glasses 325a synchronized with the output of the 3D video stream 212. According to an example, the emitter signal 326 is transmitted as a communication signal that is triggered by a start of frame in the 3D video stream 212. The emitter signal 326 may be transmitted as a radio frequency (RF) signal or an infrared (IR) signal or any other communication signal. The emitter signal 326 may be broadcast using communications technology, such as, but not limited to, pulse amplitude modulation (PAM), on/off key modulation (OOK), and frequency shift keying (FSK) modulation etc.

As shown in FIG. 3A, the 3D shutter glasses 325a may be positioned and configured to view the non-3D-ready display 122. Additionally, the 3D shutter glasses 325 is configured to receive the emitter signal 326 transmitted from the 3D video managing apparatus 302a. The 3D shutter glasses 325a is configured to lock into a frame sequence and duration of the 3D video stream 212 based on the emitter signal 326 received from the 3D video managing apparatus 302a. Because the emitter signal 326 is transmitted coincident with the display of the video content from 3D video stream 212 at the non-3D-ready display 122, shutter operations of the 3D shutter glasses 325a are synchronized with the 3D video stream 212. The shutter operations of the 3D shutter glasses 325a may be configured to alternate in time to the emitter signal 326, thereby allowing the end consumer to perceive the correct 3D effect. Because the shutter operations of the 3D shutter glasses 325a are configured to synchronize with the exact moment that the right eye frame/left eye frame is displayed on the non-3D-ready display 122, the 3D shutter glasses 325a thereby avoids crosstalk of images.

Figure 3B:
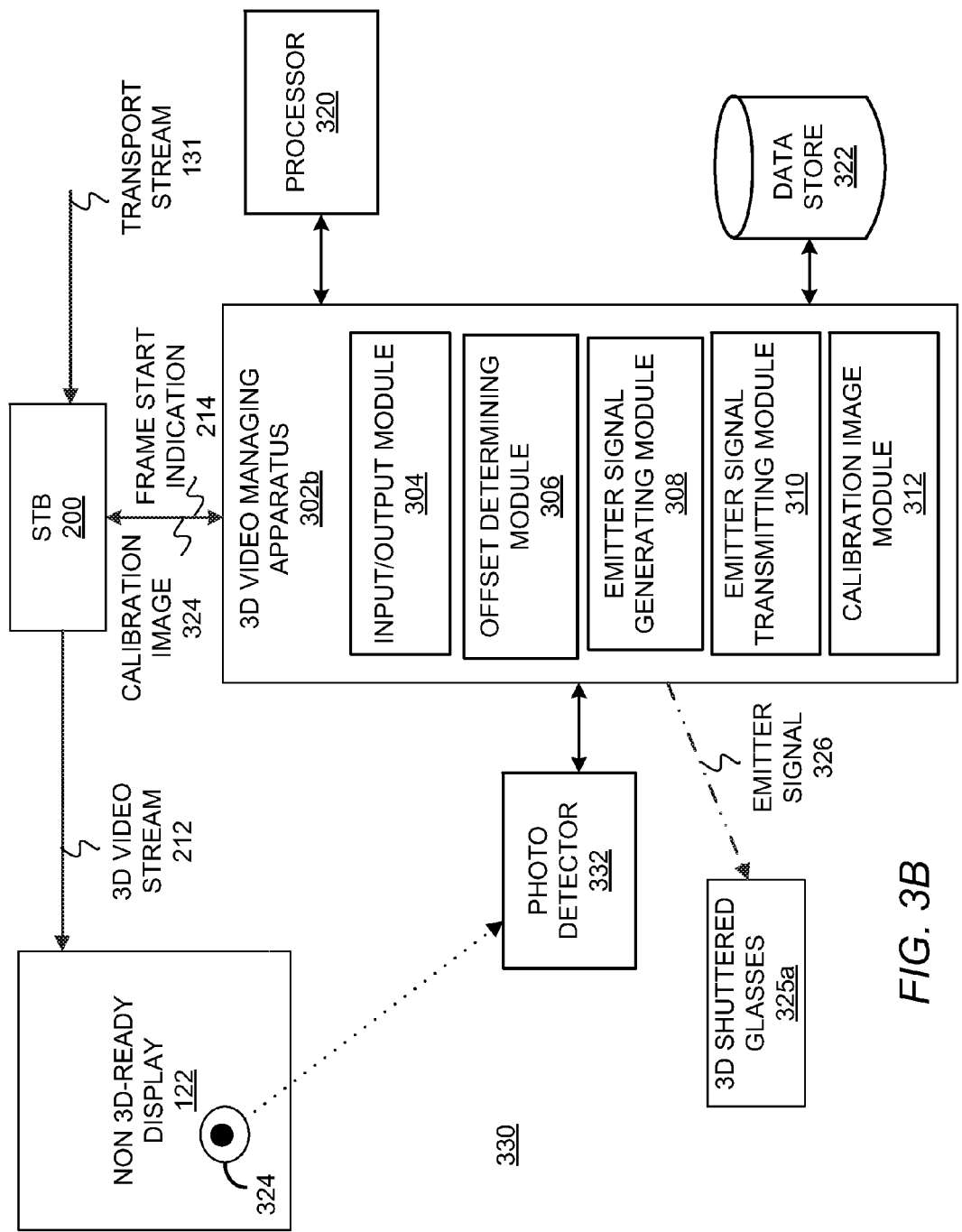
FIG. 3B illustrates a simplified block diagram of a 3D video viewing system, according to an example of the invention.

FIG. 3B illustrates a simplified block diagram of a 3D viewing system 330, according to an example. The 3D viewing system 330 is an alternate variation of the 3D viewing system 300 and as such includes some of the same components as the 3D viewing system 300. It should be understood that the 3D viewing system 330 depicted in FIG. 3B may include additional components and that some of the components described herein may be removed and/or modified without departing from a scope of the 3D viewing system 330.

In addition to the components discussed hereinabove with respect to FIG. 3A and the system 300, such as a 3D video managing apparatus, the processor 320, the data store 322, the STB 200, the non 3D-ready display 122, and the 3D shutter glasses 325a, the 3D viewing system 330 includes a photo-detector 332 that is connected to the 3D video managing apparatus 302b. The 3D viewing system 330 may not include a timing offset source in this instance. In order to determine a timing offset for the shutter operations of the 3D shutter glasses 325a, the 3D video managing apparatus 302b disclosed with respect to FIG. 3B includes an additional module, a calibration image generating module 312. The modules 304-312 of the 3D video managing apparatus 302b may be configured and stored in a similar manner as the modules 304-310 of the 3D video managing apparatus 302a described hereinabove with respect to FIG. 3A.

The calibration image generating module 312 is configured to generate at least one calibration image 324. The calibration image generating module 312 is configured to generate the calibration image 324 upon request from an end consumer and/or upon start of the 3D video stream 212. In addition, or alternatively, the calibration image generating module 312 may store the calibration image 324 in the data store 322. Alternately, the calibration image generating module 312 may retrieve a predetermined calibration image from the data store 322. In any regard, the calibration image is thereafter output to the non 3D-ready display 122 by the input/output module 304. The input/output module 304 outputs the calibration image 324 to the connected display, for instance through the STB 200 using a high definition multimedia interface (HDMI), or alternately a composite video cable. The calibration image 324 may be output in blended 3D video stream 212. The calibration image 324 is displayed at the non 3D-ready display 122 and is an image that will be detected by a photo-detector 332 connected to the 3D video managing apparatus 302b. The calibration image generating module 312 may use graphic overlay (mixing) in the STB 200 to facilitate display of the calibration image 324 at any user-commanded point in the video session. Because "pause" is a logical aspect of a video session and does not impact video framing, the calibration of a new user may be implemented during a "pause" interruption of the video session play.

According to an example, the calibration image 324 comprises a marker of predetermined color and intensity. For example, the calibration image generating module 312 may be configured to generate a calibration image 324 that comprises a red image of predetermined intensity for a right eye view of the associated shutter glasses, and a green image for a left eye view of the associated shutter glasses, which may be detected by a photo-detector at the associated shutter glasses. The photo-detector 332 may comprise an optical device that detects a particular wavelength and intensity that associates with a particular color or, in the instance of a broadband detector, white light. The photo-detector 332 at the 3D video managing apparatus 302b may comprise a narrow band photo-detector.

According to another example, the calibration image generating module 312 is configured to generate a calibration image 324 that is detectable by a wavelength photo-detector at the 3D video managing apparatus 302b. For instance, the calibration image generating module 312 may be configured to generate a calibration image 324 that has a green color (for example 520 nm-565 nm) for one view and a non green color for the other eye view. The calibration image 324 may be configured to blank after a predetermined time so that the calibration image 324 minimally interferes with the end consumer's viewing experience. The calibration image 324 is thereby removed from the 3D video content 212.

The offset determining module 306, in this example, is configured to determine a timing offset using the calibration image 324 and the frame start indication 214. More particularly, the 3D video managing apparatus 302b may use the photo-detector 332 to determine an instant that the calibration image 324 is presented at the non 3D-ready display 122. According to an example, an end consumer may position the photo-detector 332 within a predetermined proximity of the non-3D-ready display 122. The offset determining module 306 may determine an instant that the calibration image 324 is presented at the non 3D-ready display 122. The offset determining module 306 may also determine an instant that the calibration image 324 was output to the STB 200 using the frame start indication 214. The offset determining module 306 may determine the timing offset using the instant that the calibration image 324 was output to the STB 200 and the instant that the calibration image 324 is displayed.

The emitter signal generating module 308 generates an emitter signal 326 and the emitter signal transmitting module 310 transmits the emitter signal 326 as described with respect to FIG. 3A hereinabove. Thereafter, the 3D video managing apparatus 302b may provide the emitter signal 326 to end consumers upon request, for instance when multiple end consumers with appropriately configured shutter glasses join a viewing of the 3D video content 212 already in progress.

Figure 3C:
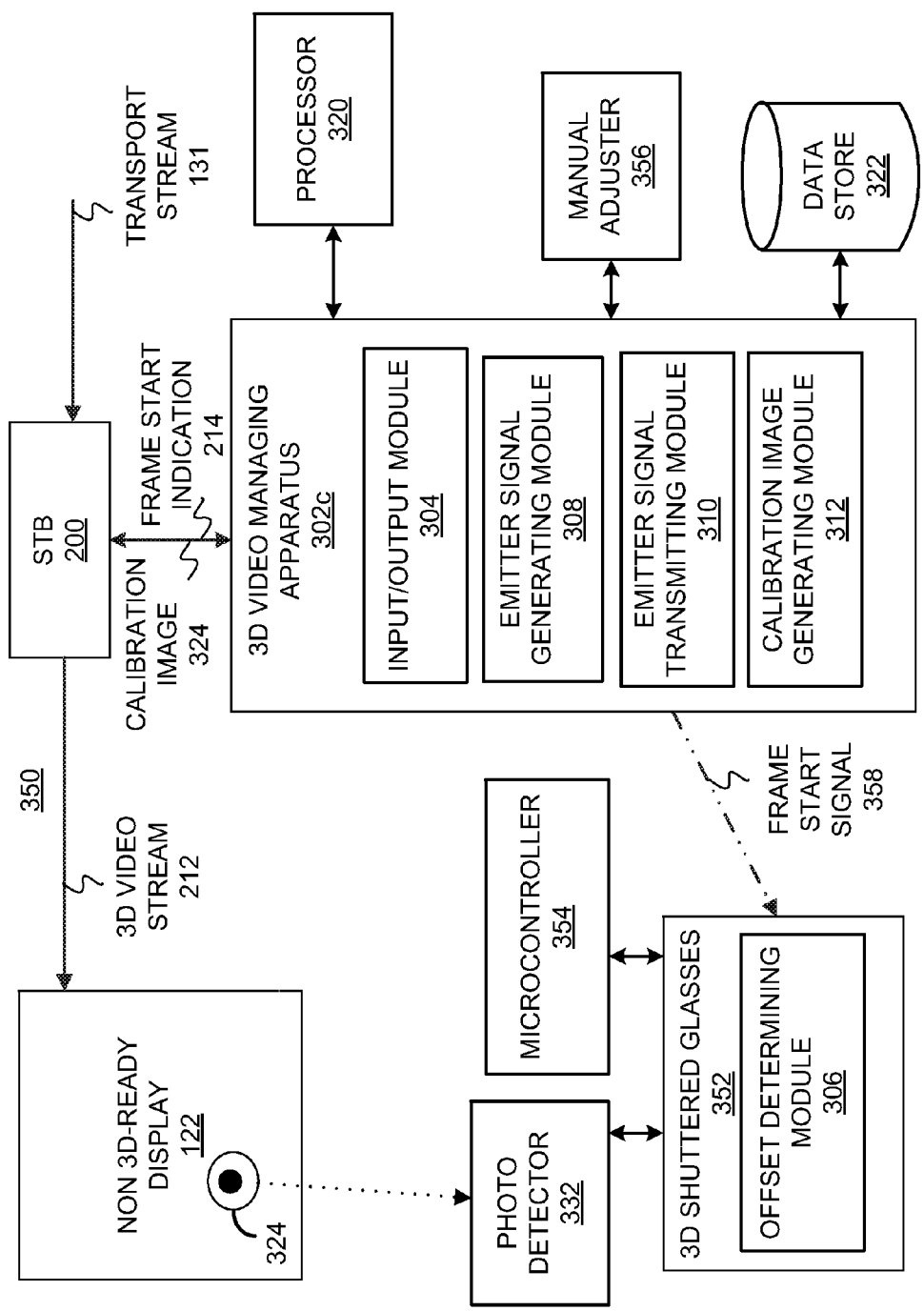
FIG. 3C illustrates a simplified block diagram of a 3D video viewing system, according to an example of the invention.

FIG. 3C illustrates a simplified block diagram of a 3D viewing system 350, according to an example. The 3D viewing system 350 is an alternate variation of a 3D viewing system, for instance the 3D viewing systems 300 and 330 disclosed in FIGS. 3A and 3B hereinabove and as such includes some of the same components as the 3D viewing systems 300 and 330. Additionally, the 3D viewing system 350 excludes some of the components, and/or configures differently some of the components of the 3D viewing systems 300 and 330. It should be understood that the 3D viewing system 350 depicted in FIG. 3C may include additional components and that some of the components described herein may be removed and/or modified without departing from a scope of the 3D viewing system 350.

According to an example, the 3D viewing system 350 includes components similar to those discussed hereinabove with respect to FIG. 3B and the system 330, such as the processor 320, the data store 322, the STB 200, the non 3D-ready display 122. The 3D video managing apparatus 302c includes an input/output module 304, an emitter signal generating module 308, an emitter signal transmitting module 310, and a calibration image generating module 312. The modules 302-304 and 308-312 include similar functionality as the modules 302-304 and 308-312 described hereinabove with respect to FIGS. 3A and 3B. The 3D video managing apparatus 302c may additionally include a manual adjuster 356. The manual adjuster 356 gives a user a manual control to adjust the timing offset. The user can adjust the timing offset until the 3D display seen through the 3D shutter glasses 352 is at a sufficient level of definition. The timing offset may be in the units of pixel spacing, line duration, field period and frame period.

The emitter signal generating module 308 of the 3D video managing apparatus 302c generates a frame start signal 358 using the frame start indication 214. The frame start signal 358 is a shutter control signal and contains same information as the frame start indication 214 and may be transmitted in a similar manner as the emitter signal 326 described hereinabove with respect to FIGS. 3A and 3B.

Note that in this example the 3D video managing apparatus 302c does not include the offset determining module 306 and that the timing offset is not determined with regard to this example at the 3D video managing apparatus 302c. The 3D viewing system 350 may not include a timing offset source in this instance. Alternately, the timing offset source may provide a timing offset to the 3D shutter glasses 352.

The 3D shutter glasses 352 used in the 3D viewing system 350 may be configured to determine the timing offset. As such, the 3D shutter glasses 352 includes an offset determining module, such as the offset determining module 306 described hereinabove with respect to FIG. 3B, and a connected photo-detector 332. The offset determining module 306 may be implemented by a microcontroller 354 located in the 3D shutter glasses 352. The microcontroller 354 may comprise a latch circuit transistor or similar device having a capability to determine the timing offset. In order to determine the timing offset for the shutter operations of the 3D shutter glasses 352, the 3D shutter glasses 352 disclosed with respect to FIG. 3C may detect the calibration image 324 using the connected photo-detector 332.

According to an example, the 3D shutter glasses 352 may be configured to initially synchronize shutter operations with the 3D video stream when the calibration image 324 is displayed on the non-3D-ready display 122. For instance, an end consumer may position the 3D shutter glasses 325 within a predetermined proximity of the non-3D-ready display 122. The 3D shutter glasses 352 may be configured to detect the calibration image 324, for instance for a right eye frame or left eye frame, using the photo-detector 332. Thereafter the offset determining module 306 located in the 3D shutter glasses 352 may be used to compare the time that the calibration image 324 is detected at the predetermined intensity to the time the frame start signal 358 transmitted by the 3D video managing apparatus 302c is received in order to determine a timing offset to the frame start signal 358.

The frame start signal 358 transmitted from the 3D video managing apparatus 302c restricts the 3D shutter glasses 352 timing base from drifting over the course of viewing the 3D video content. The 3D shutter glasses 352 thereby maintain synchronization of shutter operations with presentation of the video content from the 3D video stream 212 at the non-3D-ready display 122. For example, in instance in which the timing in 3D shutter glasses 352 drifts at a rate of 0.01 sec for each half an hour, the left eye view at the 3D shutter glasses 352 may comprise a partial right eye image and the right eye view at the 3D shutter glasses 352 may comprise a partial left eye image. The 3D shutter glasses 352 is configured to use the frame start signal 358 and the timing offset to maintain synchronization of the shutter operations with the 3D video stream 212 i.e. to prevent timing drift of the shutter operations of the 3D shutter glasses 352. The 3D shutter glasses 352 is configured to synchronize shutter operations of the 3D shutter glasses 352 and the 3D video stream so that the end consumer may properly view the 3D video stream 212 using the 3D shutter glasses 352.

According to an example, the data store 322 comprises volatile or non-volatile memory, such as dynamic random access memory (DRAM), electrically erasable programmable read-only memory (EEPROM), magnetoresistive random access memory (MRAM), hard disks, and the like. In this example, the modules 302-312 comprise software modules stored in the memory. According to a further example, the modules 302-312 of the 3D video managing apparatuses 302a, 302b and 302c comprise a combination of hardware and software modules.

Figure 4A:
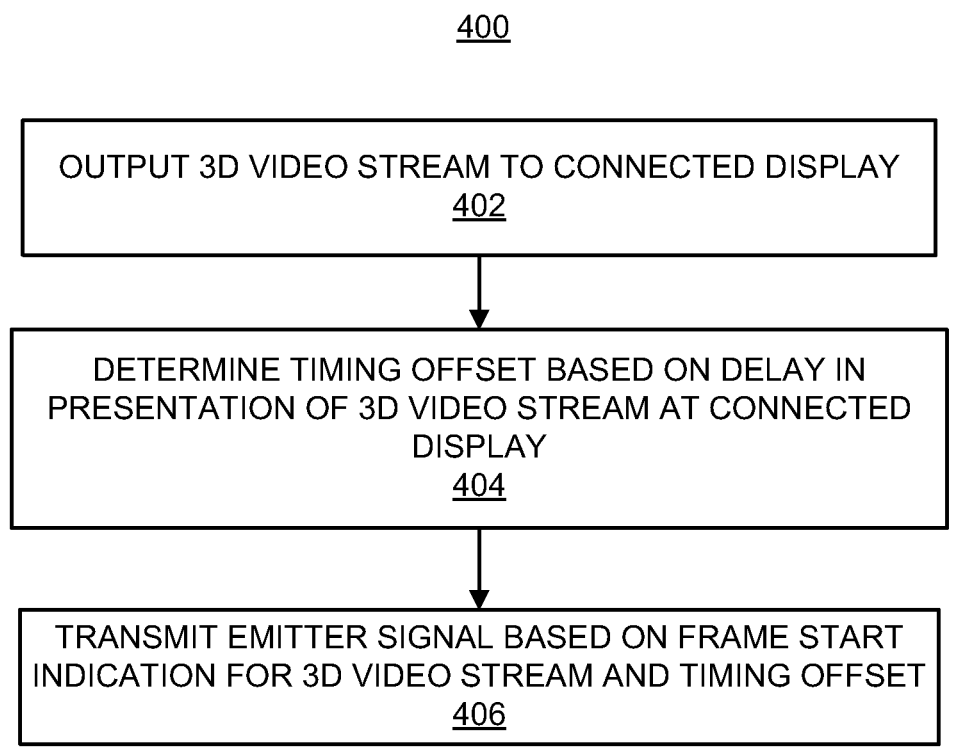
FIG. 4A illustrates a flow diagram of a method of managing a 3D video stream, according to an example of the invention.
Figure 4B:
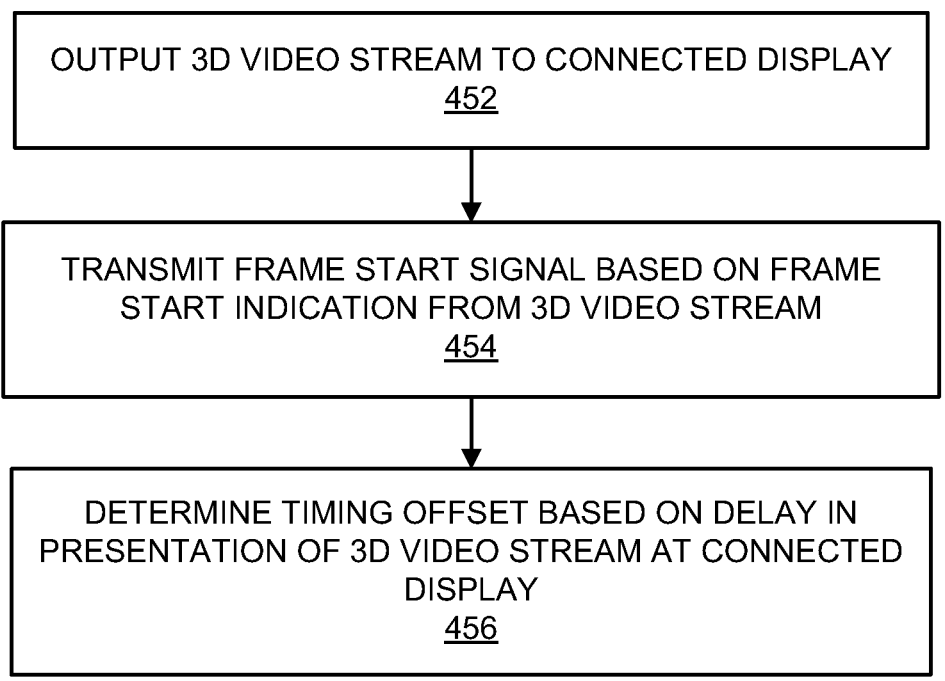
FIG. 4B illustrates a flow diagram of a method of managing a 3D video stream, according to an example of the invention.

Examples of methods in which 3D viewing systems, 3D video managing apparatuses, and 3D shutter glasses may be employed for viewing content from a 3D video stream are now described with respect to the following flow diagram of the methods 400 and 450 depicted in FIGS. 4A and 4B. It should be apparent to those of ordinary skill in the art that the methods 400 and 450 represent generalized illustrations and that other processes may be added or existing processes may be removed, modified or rearranged without departing from the scope of the methods 400 and 450. In addition, the methods 400 and 450 are described with respect to the components depicted in FIGS. 3A, 3B, and 3C by way of example and not of limitation.

Some or all of the operations set forth in the methods 400 and 450 may be contained as one or more computer programs stored in any desired computer readable medium and executed by a processor on a computer system. Exemplary computer readable media that may be used to store software operable to implement the invention include but are not limited to conventional computer system RAM, ROM, EPROM, EEPROM, hard disks, or other data storage devices.

At block 402, a 3D video stream 212 is output to a connected display, for instance by the STB 200. The connected display may comprise, for instance a non-3D-ready display such as the non-3D-ready display 122 described hereinabove. The 3D video stream 212 is in a time sequential format. The connected display is configured to display the 3D video stream 212 after a delay. The delay may comprise processing delay, transmission delay, buffer delay etc. as described hereinabove with respect to FIG. 3A.

At block 404, a timing offset may be determined, for instance by the offset determining module 306 in the 3D video managing apparatus 302b as described hereinabove with respect to FIG. 3B. Alternately, the timing offset may be determined by receiving the timing offset from a timing offset source 328 as described hereinabove with respect to FIG. 3A. The timing offset source 328 may comprise a data base from which a delay associated with a particular connected display may be determined. In other instances the timing offset may be received from a device configured to determine the timing offset, for instance shutter glasses such as the shutter glasses 352 as described with respect to FIG. 3C.

According to an example, the timing offset is determined using a calibration image 324. More particularly, a calibration image 324 is output to the connected display. The connected display displays the calibration image 324 after the delay associated with the connected display. The offset determining module 306 determines the timing offset using the instant that the calibration image 324 is presented at the connected display, which may be determined using a photo-detector 332, and an instant that the calibration image 324 was output from the STB 200 to the connected display, which may be determined using the frame start indication 214. The offset determining module 306 may then subtract the instant that the calibration image 324 was output from the STB 200 from the instant that the calibration image 324 is presented at the connected display to determine the timing offset.

At block 406, an emitter signal 326 is transmitted that allows a shutter glasses 325a to synchronize shutter operations with presentation of the 3D video stream 212 at the connected display, for instance by the 3D video managing apparatus 302a. In this example, the emitter signal 326 comprises a shutter control signal that adjusts for the delay in presentation of the 3D video stream 212 at the connected display. A shutter glasses, for instance the 3D shutter glasses 325a, may be configured to use the emitter signal 326 to determine a frame rate of the 3D video stream 212. The emitter signal 326 synchronizes shutter operations of the shutter glasses with the 3D video stream 212 by the emitter signal generating module 308 and maintains synchronization of the shutter operations with the presentation of the 3D video stream 212.

FIG. 4B illustrates a simplified block diagram of a method 450 for viewing content from a 3D video stream, according to an example. The method 450 is an alternate variation of a method for viewing content from a 3D video stream, for instance the method 400 disclosed in FIG. 4A hereinabove and as such includes some of the same processes as the method 400. The method 450 is described with respect to a shutter glasses 352 having capability of determining a timing offset described hereinabove with respect to FIG. 3C.

At block 452, a 3D video stream 212 is output to a connected display, for instance by the STB 200. The connected display may comprise, for instance a non-3D-ready display such as the non-3D-ready display 122 described hereinabove. The 3D video stream 212 is in a time sequential format. The connected display is configured to display the 3D video stream 212 after a delay.

At block 454, a frame start signal 358 is transmitted that allows a shutter glasses 352 to synchronize shutter operations with presentation of the 3D video stream 212 at the connected display, for instance by the 3D video managing apparatus 302c described with respect to FIG. 3C hereinabove. In this example, the frame start signal 358 includes the same information as the frame start indication 214. A shutter glasses, for instance the 3D shutter glasses 352, may be configured to use the frame start signal 358 to determine a frame rate of the 3D video stream 212.

At block 456, a timing offset may be determined, for instance by the offset determining module 306 in the 3D shutter glasses 352. According to an example, the 3D video managing apparatus 302c may be configured to output the calibration image 324 to the connected display. The 3D shutter glasses 352 may use a connected photo-detector 332, for instance a built-in photo-detector, to determine an instant that the calibration image 324 is presented at the connected display. The shutter glasses receives the frame start signal 358 and may then compare the instant the calibration image 324 is output from the STB 200 and the instant the calibration image 324 is presented at the connected display to determine the timing offset.

Alternately, the timing offset may be determined by receiving the timing offset at the 3D shutter glasses 352 from a timing offset source 328. The timing offset source 328 may comprise a data base from which a delay associated with a particular connected display may be determined. For instance, the timing offset may be transmitted to end consumers upon request, for instance by the 3D video managing apparatus 302c when a request is received from an end consumer through a device configured to provide the request for the timing offset, such as a remote control unit, or any other device capable of providing the request.

The delay associated with the connected display may be based on factors including resolution of video content presented at the connected display and processing latency of the 3D video stream 212 in the connected display. In some instances, some of these factors may change, in turn changing the delay. The 3D shutter glasses 352 may be configured to determining when the delay associated with the presenting the 3D video stream at the connected display has substantially changed and to determine a new timing offset based on the changed delay. The 3D shutter glasses 352 may use the new timing offset to preserve synchronization of the shutter operations with the presentation of content from the video stream 212 at the connected display.

Figure 5:
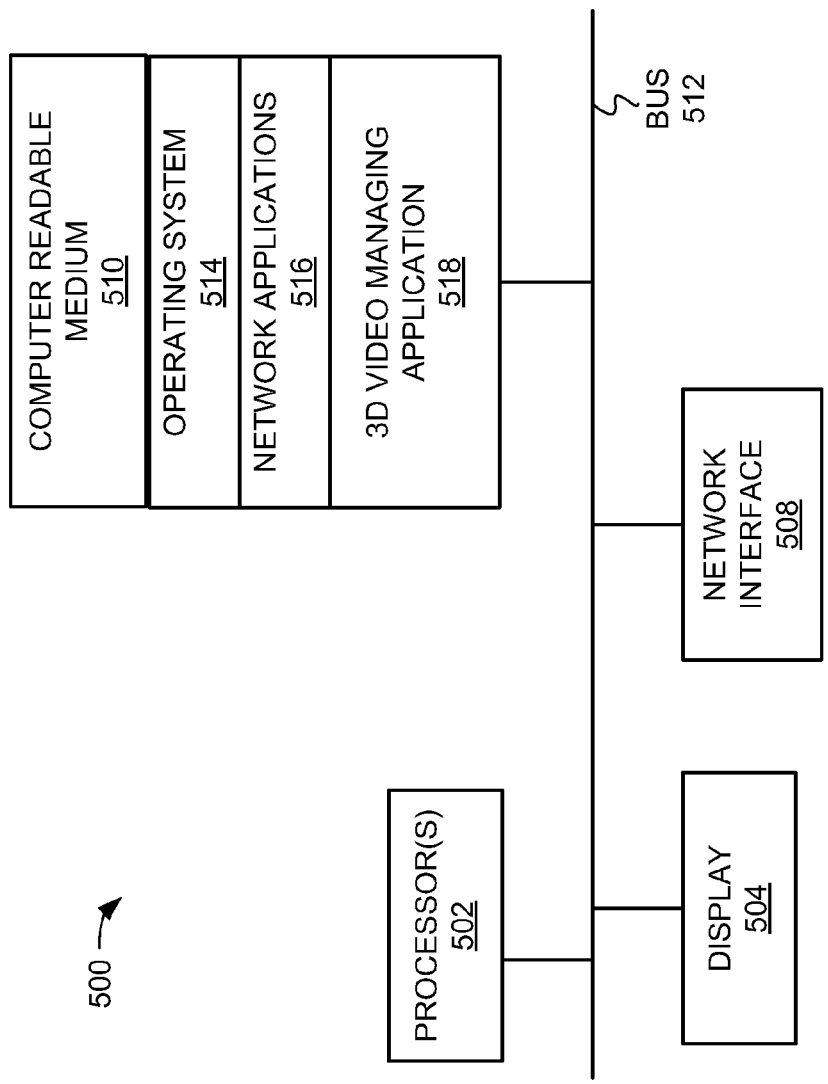
FIG. 5 shows a block diagram of a computer system that may be used in managing 3D video stream, according to an example of the invention.

Turning now to FIG. 5, there is shown a schematic representation of a computing device 500 configured in accordance with examples of the invention. The computing device 500 includes one or more processors 502, such as a central processing unit; one or more display devices 504, such as a monitor; one or more network interfaces 508, such as a Local Area Network LAN, a wireless 802.11x LAN, a 3G mobile WAN or a WiMax WAN; and one or more computer-readable mediums 510. Each of these components is operatively coupled to one or more buses 512. For example, the bus 512 may be an EISA, a PCI, a USB, a FireWire, a NuBus, or a PDS.

The computer readable medium 510 may be any suitable medium that participates in providing instructions to the processor 502 for execution. For example, the computer readable medium 510 may be non-volatile media, such as an optical or a magnetic disk; volatile media, such as memory; and transmission media, such as coaxial cables, copper wire, and fiber optics. Transmission media can also take the form of acoustic, light, or radio frequency waves. The computer readable medium 510 may also store other software applications, including word processors, browsers, email, Instant Messaging, media players, and telephony software.

The computer-readable medium 510 may also store an operating system 514, such as Mac OS, MS Windows, Unix, or Linux; network applications 516; and a video encoding/decoding application 518. The operating system 514 may be multi-user, multiprocessing, multitasking, multithreading, real-time and the like. The operating system 514 may also perform basic tasks such as recognizing input from input devices, such as a keyboard or a keypad; sending output to the display 504; keeping track of files and directories on medium 510; controlling peripheral devices, such as disk drives, printers, image capture device; and managing traffic on the one or more buses 512. The network applications 516 include various components for establishing and maintaining network connections, such as software for implementing communication protocols including TCP/IP, HTTP, Ethernet, USB, and FireWire etc.

The 3D video managing application 518 provides various software components for managing 3D video stream, as discussed above. In certain examples, some or all of the processes performed by the application 518 may be integrated into the operating system 514. In certain examples, the processes can be at least partially implemented in digital electronic circuitry, or in computer hardware, firmware, software, or in any combination thereof, as also discussed above.

Examples of the invention provide a method and apparatus for managing 3D video stream. All display devices are known to have a various delay depending on the manufacturer between receipt of 3D video stream and display of the 3D video stream. The examples herein described accommodate this delay for various display devices. The examples provide a process for an associated shutter glasses to determine a timing offset based on the delay. The examples also provide a tracking mechanism, herein described as a frame start indication, and concurrent to the 3D video stream provided to the display device such that this synchronization is maintained at the associated shutter glasses over the course of viewing the 3D video content. Non-3D-ready displays may thereby be used to present 3D video stream that is properly synchronized with the associated shutter glasses.

What has been described and illustrated herein are examples of the invention along with some of their variations. The terms, descriptions and figures used herein are set forth by way of illustration only and are not meant as limitations. Those skilled in the art will recognize that many variations are possible within the spirit and scope of the invention, wherein the invention is intended to be defined by the following claims—and their equivalents—in which all terms are meant in their broadest reasonable sense unless otherwise indicated.

What is claimed is:

1. A method of managing a three-dimensional (3D) video stream, the method comprising:
   outputting, by a set top box (STB), the 3D video stream in a time sequential format to a connected display, wherein the 3D video stream has a first resolution during a first time and a second resolution during a second time;
   presenting on the connected display the 3D video stream after a delay associated with the connected display;
   determining a first timing offset based on the delay based at least in part on a model of the connected display and the first resolution of the 3D video stream;
   determining a second timing offset based on the delay based at least in part on the model of the connected display and the second resolution of the 3D video stream;
   transmitting, coincident with the presentation of the 3D video stream, a shutter control signal for the 3D video stream from a device other than the STB and the connected display;
   determining by the at least one shutter glasses a frame rate of the 3D video stream using the shutter control signal;
   using the first timing offset and the shutter control signal to synchronize shutter operations of at least one shutter glasses with the presentation of the 3D video stream during the first time; and
   using the second timing offset and the shutter control signal to synchronize shutter operations of the at least one shutter glasses with the presentation of the 3D video stream during the second time.

2. The method of claim 1, wherein determining the first timing offset based on the delay comprises:
   outputting a calibration image to the connected display, wherein the connected display presents the calibration image after the delay;
   detecting the calibration image at an instant of presentation of the calibration image using a photo-detector;
   determining an instant that the calibration image is transmitted from the STB using the shutter control signal, wherein the shutter control signal is a frame start signal having a same information as a frame start indication; and
   determining the first timing offset using the instant that the calibration image was transmitted and the instant of presentation of the calibration image.

3. The method of claim 2, wherein outputting the calibration image to the connected display comprises outputting the calibration image at a predetermined color and intensity to the associated display in a format detectable by the photodetector.

4. The method of claim 2, wherein outputting the calibration image to the connected display further comprises one of outputting the calibration image at start of the 3D video stream and outputting the calibration image on request during an entire session of the 3D video stream.

5. The method of claim 2, wherein the at least one shuttered glasses determines the first timing offset using the instant that the calibration image was transmitted and the instant of presentation of the calibration image.

6. The method of claim 1, wherein determining the first timing offset based on the delay comprises:
   receiving the first timing offset from one of an associated device and a predetermined database based on specifications of the connected display.

7. The method of claim 1, wherein determining the first timing offset based on the delay comprises:

outputting a calibration image to the connected display, wherein the connected display presents the calibration image after the delay; and manually adjusting the first timing offset until the presentation of the calibration image determined using the at least one shutter glasses is at a sufficient level of definition.

8. The method of claim 1, wherein the shutter control signal comprises an emitter signal determined using the first timing offset and a frame start indication from the 3D video stream.

9. The method of claim 1, wherein the shutter control signal comprises a frame start signal containing a same information as a frame start indication from the 3D video stream; and wherein the at least one shutter glasses is configured to receive the frame start signal, to determine the first timing offset, to determine the frame rate of the 3D video stream using the frame start signal, and to synchronize the shutter operations of the at least one shutter glasses with the 3D video stream using the frame start signal.

10. The method of claim 9, further comprising:
transmitting the first timing offset from the at least one shutter glasses to be received by at least one secondary device.

11. The method of claim 1, wherein the delay associated with the connected display is based on one or more of a resolution of video content presented at the connected display and processing latency of the 3D video stream in the connected display, further comprising:
determining whether the delay associated with the presenting the 3D video stream at the connected display has substantially changed; and
determining a new timing offset based on the changed delay.

12. A system for managing a three-dimensional (3D) video stream, the system comprising:
at least one shutter glasses that determine a frame rate of the 3D video stream using a shutter control signal;
one or more modules configured to:
output the 3D video stream in a time sequential format to a connected display, wherein the 3D video stream has a first resolution during a first time and a second resolution during a second time;
present on the connected display the 3D video stream after a delay associated with the connected display;
determine a first timing offset based on the delay based at least in part on a model of the connected display and the first resolution of the 3D video stream;
determine a second timing offset based on the delay based at least in part on the model of the connected display and the second resolution of the 3D video stream;
transmit, coincident with the presentation of the 3D video stream, the shutter control signal from the 3D video stream from a device other than the STB and the connected display;
use the first timing offset and the shutter control signal to synchronize shutter operations of at least one shutter glasses with the presentation of the 3D video stream during the first time; and
use the second timing offset and the shutter control signal to synchronize shutter operations of the at least one shutter glasses with the presentation of the 3D video stream during the second time; and
a processor configured to implement the one or more modules.

13. The system of claim 12, wherein the one or more modules are further configured to output a calibration image to the connected display, wherein the connected display presents the calibration image after the delay, to detect the calibration image at an instant of presentation of the calibration image using a photo-detector, and to determine an instant that the calibration image is transmitted using the shutter control signal, wherein the shutter control signal is a frame start signal having a same information as a frame start indication and to determine the first timing offset using the instant that the calibration image was transmitted and the instant of presentation of the calibration image.

14. The system of claim 13, wherein the one or more modules are configured to output the calibration image at a predetermined color and intensity to the connected display.

15. The system of claim 13, wherein one or more modules are further configured to output the calibration image to the connected display in a format detectable by the shutter glasses using a built in photo-detector.

16. The system of claim 13, wherein the one or more modules are further configured to determine the first timing offset using an associated photo-detector and the calibration image, and transmit the first timing offset, wherein the transmitted first timing offset is to be receivable by at least one shutter glasses.

17. The system of claim 12, wherein the one or more modules determine the shutter control signal as an emitter signal using the first timing offset and a frame start indication from the 3D video stream.

18. The system of claim 12, wherein the one or more modules determine the shutter control signal as a frame start signal based on a frame start indication from the 3D video stream; and
wherein the at least one shutter glasses is configured to receive the frame start signal, to determine the first timing offset, to determine the frame rate of the 3D video stream using the frame start signal, and to synchronize the shutter operations of the at least one shutter glasses with the 3D video stream using the frame start signal.

19. The system of claim 12, wherein the at least one shutter glasses includes one or more modules configured to transmit the first timing offset to be received by at least one secondary device.

20. A non-transitory computer-readable storage medium on which is embedded one or more computer programs, said one or more computer programs implementing a method for managing a three-dimensional (3D) video stream, said one or more computer programs comprising computer readable code to:
output the 3D video stream in a time sequential format to a connected display, wherein the 3D video stream has a first resolution during a first time and a second resolution during a second time;
present on the connected display the 3D video stream after a delay associated with the connected display;
determine a first timing offset based on the delay based at least in part on a model of the connected display and the first resolution of the 3D video stream;
determine a second timing offset based on the delay based at least in part on the model of the connected display and the second resolution of the 3D video stream;
transmit, coincident with the presentation of the 3D video stream, a shutter control signal from the 3D video stream from a device other than the STB and the connected display;

determine by the at least one shutter glasses a frame rate of the 3D video stream using the shutter control signal;

use the first timing offset and the shutter control signal to synchronize the shutter operations of the at least one shutter glasses with the presentation of the 3D video stream during the first time; and use the second timing offset and the shutter control signal to synchronize shutter operations of the at least one shutter glasses with the presentation of the 3D video stream during the second time.

* * * * *